UNITED STATES PATENT OFFICE.

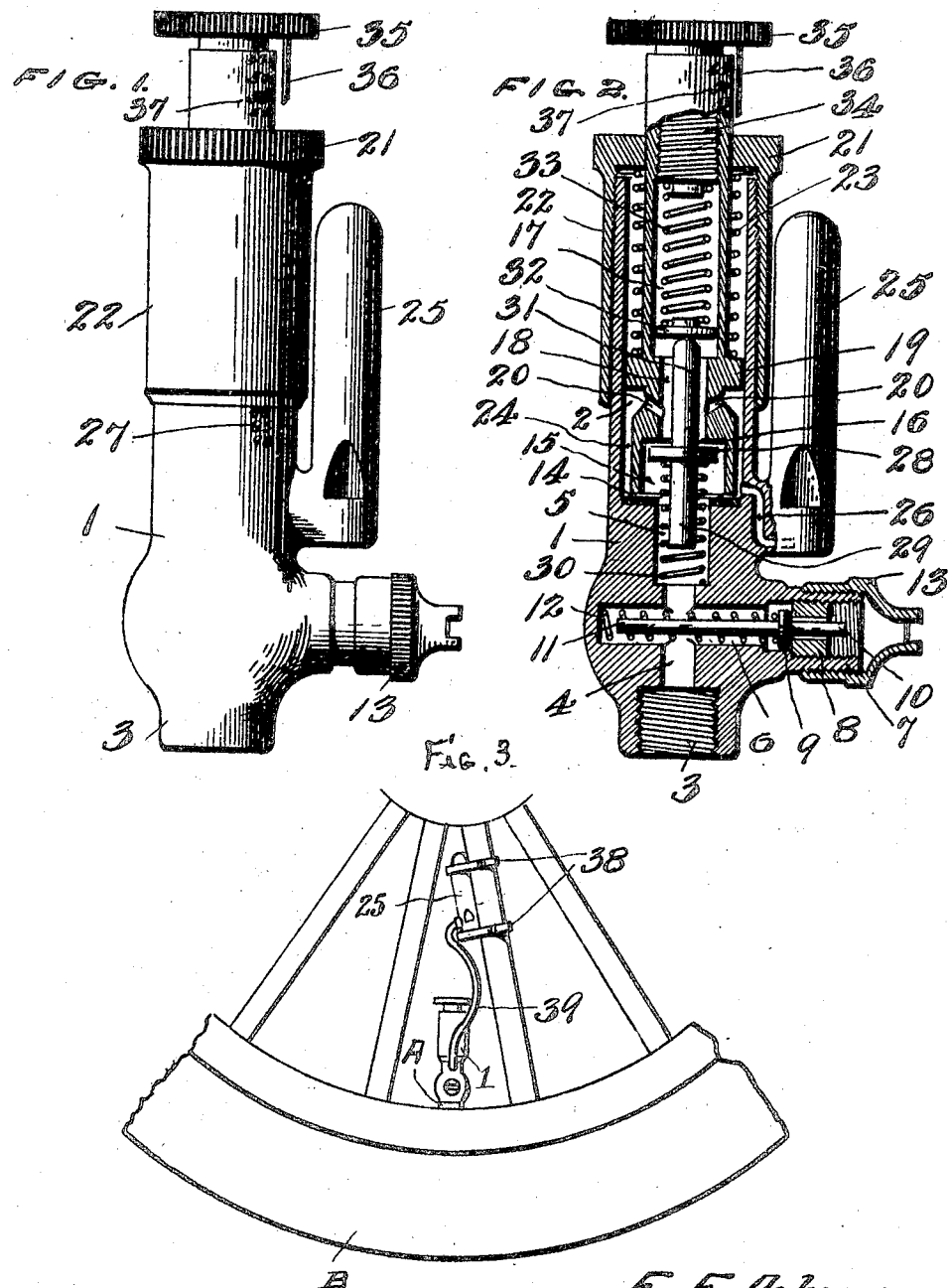

FRANK F. ASHMORE, OF KANSAS CITY, MISSOURI.

AUTOMATIC-ALARM TIRE-VALVE.

960,246. Specification of Letters Patent. Patented June 7, 1910.

Application filed June 17, 1909. Serial No. 502,794.

*To all whom it may concern:*

Be it known that I, FRANK F. ASHMORE, a citizen of the United States, residing at Kansas City, in the county of Jackson and State of Missouri, have invented certain new and useful Improvements in Automatic-Alarm Tire-Valves, of which the following is a specification.

My invention relates to tire valves, and more particularly to a tire valve, having a suitable alarm in connection therewith, for instance a whistle, automatic in its action, to sound the alarm when the pressure within the tire exceeds and falls to a selected point below, the desired pressure in the tire, and the object of my invention is to provide a simple and inexpensive device which will be neat in appearance and adapted for attachment to a valve tube of a tire when the ordinary valve parts of the tube are removed.

In the accompanying drawing, illustrating my invention, and forming a part of this specification, Figure 1 is a side elevation of my improved valve. Fig. 2 is a central vertical sectional view therethrough, and, Fig. 3 is a view illustrating the practical application of my improved valve, and showing a slightly modified form thereof.

In accordance with my invention, and with special reference to Figs. 1 and 2, I provide a casing 1, having tubular ends 2 and 3, and a longitudinal central opening 4, communicating between said tubular ends and provided with an enlargement 5 adjacent the tubular end 2, forming a shoulder at its base. The tubular end 3 is threaded as shown for connection upon the valve tube A of a tire B shown in Fig. 3. The body portion of the casing 1, between its tubular ends 2 and 3, also has a bore 6 extending inwardly from one side thereof, and at right angles to and communicating with, its longitudinal opening 4, said bore 6 having an enlarged outer portion communicating with the interior of an internally and externally threaded tubular extension 7, in which is adjustably mounted a threaded central apertured block 8, against the inner surface of which is seated a disk valve 9, having the outer portion 10 of its stem projecting through the aperture of said block, and the inner end 11 of its stem, extending inwardly of the bore 6. A spring 12 coiled about the stem portion 11, and compressed between the inner end of bore 6 and the inner surface of valve disk 9, serves to hold said valve outwardly and seated against block 8, at all times except when its stem portion 10 is pressed inwardly in pumping up the air. The usual cap 13 engages upon the external face of the tubular extension 7, to prevent the entrance of foreign matter.

The tubular end 2 of casing 1 is provided with a gasket ring 14 in its inner end, forming a valve seat for the inner tubular end 15 of the high pressure valve 16, which valve 16 has an outer tubular end 17 and a central longitudinal opening 18 communicating between its said tubular ends 15 and 17. Valve 16 is further provided with an external circular shoulder 19, surrounding the same at the base of its tubular end 17, and with radial openings 20 extending through its wall from its central longitudinal opening 18.

The extremity of the tubular end 2 of casing 1 is externally threaded, and the tubular end 17 of valve 16 projects centrally and exteriorly through a bushing 21, the sleeve portion of which is internally threaded to be secured upon the threaded extremity of the tubular end 2 of casing 1, whereby to adjust and regulate the force of a spring 23 coiled about the tubular end 17 of valve 16, and compressed between the end of said bushing 21 and the shoulder 19 of said valve, whereby to force its inner tubular end 15 against the ring 14 forming a seat therefor. The inner tubular end 15 of the valve 16 is of sufficiently reduced diameter in comparison to the tubular end 2 of casing 1, within which it extends, to provide an air space 24, and a whistle 25 which may be formed integral with casing 1 as shown in Figs. 1 and 2, has a port 26 leading thereto from said air space 24. Thus, when the pressure within the tire rises above a selected pressure, to which spring 23 is adjusted, valve 16 is forced outwardly from its seat, and the air rushing through port 26 and through whistle 25, sounds an alarm. The outer surface of the tubular end 2 of casing 1 may be provided with a pressure gage 27, shown in Fig. 1, the circular edge of the sleeve portion 22 of bushing 21 forming an indicator to such gage.

A disk 28 is seated against the inner end of the hollow tubular extension 15 of valve 16 whereby to prevent air from escaping through wall openings 20 of said valve 16 when the latter is tightly upon its seat 14, said disk 28 having its inner stem portion 29 extending within the enlarged portion 25 of the longitudinal opening 4 of valve casing 1, and having coiled about said stem portion 29, a spring 30 compressed between the base of said enlargement 5 and the disk 28 whereby to hold said disk seated. The outer stem portion 31 of disk 28 projects through the central opening 18 of valve 16, and a circular plate 32 movable within the tubular extension 17 of said valve 16 presses against said end of said stem, under actuation of a coil spring 33 compressed between the same and the inner end of plug 34 threaded within the exterior portion of said tubular end 17, and having a knurled outer head 35 by which it may be adjusted. The head 35 has an indicator 36 extending upon the outer surface of the exterior portion of tubular extension 17, which tubular extension 17 has a pressure gage 37. Plug 34 is adjusted in use, to regulate spring 33 to a pressure equal to that of about ten pounds below the pressure sufficient to move valve 16 from its seat. Thus the pressure within the tire ranges within ten pounds without actuating the alarm, but when the same falls below the ten pounds, spring 33 forces disk 28 inwardly from its seat, and the air escapes through openings 20 through the wall of valve 16 and through port 26 to sound the whistle.

In the practical application of my invention, in connection with automobile wheels, as shown in Fig. 3, in view of the fact of the necessity at times, for travel upon muddy roads, where the whistle 25 might be clogged up, I may form the whistle separate from the casing 1 and secure the same by clips 38 upon a spoke of the wheel at one side of the valve, and at the inner end of the spoke near the hub, where the whistle will be more protected, connecting the whistle with the air port 26 by a tube 39 having suitable connections in its ends.

Having fully described my invention, I claim:

1. A tire valve comprising a casing having a main air opening, an alarm device, high and low pressure valves controlling communication between said opening and said alarm device, and a valved air inlet at right angles to, and communicating with, such main opening, between said pressure valves and one end of the said casing, which latter end is formed for engagement with a tire inlet tube, substantially as described.

2. A tire valve comprising a casing having a main longitudinal body opening, and a tubular end portion, its opposite end being threaded for engagement with a tire inlet tube, an alarm device, high and low pressure valves mounted within said tubular end, and controlling communication between said body opening and said alarm device, and a valved air inlet tube, the opening in which extends at right angles within the casing and communicates with the body opening thereof, between the said pressure valves and its said threaded end, substantially as described.

3. A tire valve comprising a casing having one end thereof formed for engagement with a tire inlet tube, and having a tubular opposite end and a body opening communicating between said ends, a tubular high pressure valve member having its inner end seated inwardly against the inner end of said tubular casing end, and provided with openings through its wall, an alarm device having communication with the tubular casing end around said valve member, and a low pressure valve member seated outwardly within the inner end of said high pressure valve member, between the inner end and the openings of the latter, substantially as described.

4. A tire valve comprising a casing having one end threaded for engagement with a tire inlet tube, and having a tubular opposite end and a body opening communicating between said ends, a high pressure member having an inner tubular end seated inwardly against the inner end of said tubular casing end, and provided with an annular shoulder, a bushing threaded upon the extremity of said tubular casing end, said valve member having a tubular outer end portion projecting exteriorly through said bushing and provided with openings through its wall, a spring surrounding said tubular portion of said valve member and compressed between its said shoulder and the said bushing, and adjustable by means of the latter, and an alarm device for communication with said tubular casing end around said valve member, a low pressure valve member seated outwardly against the end of the tubular inner end of said high pressure valve member, and provided with an outwardly projecting stem, a plug adjustably threaded within, and closing the outer end of the outer tubular portion of said high pressure valve member, and a spring compressed between said plug and the outer end of the stem of said low pressure valve member, substantially as described.

5. A tire valve comprising a casing, an alarm device associated with said casing, means of communication between the tire and said alarm device including said casing, a high pressure valve arranged within said casing for normally closing communication between said tire and said alarm device, means arranged upon said high pressure valve for normally cutting off communication between said tire and said alarm device, and establishing such communication when the pressure within said tire falls below a predetermined degree, and means arranged upon said casing for admitting of the introduction of air into said tire, substantially as described.

In testimony whereof I affix my signature in presence of two witnesses.

FRANK F. ASHMORE.

Witnesses:
ALBERT L. BENNETT,
CLOID E. KEPNER.